United States Patent [19]

Woodcock

[11] Patent Number: 4,998,689
[45] Date of Patent: Mar. 12, 1991

[54] 90 DEGREE ROTATION AIRCRAFT WING

[75] Inventor: Robert R. Woodcock, Sylmar, Calif.

[73] Assignee: Rockwell International Corporation, El Segundo, Calif.

[21] Appl. No.: 380,065

[22] Filed: Jul. 14, 1989

[51] Int. Cl.$^5$ ................................................ B64C 3/38
[52] U.S. Cl. ...................................... 244/46; 244/328; 244/39; 244/201; 244/203
[58] Field of Search ................. 244/46, 49, 2, 39, 201, 244/203, 3.1, 3.28

[56] References Cited

U.S. PATENT DOCUMENTS 3,155,344 11/1964 Vogt ........................................ 244/46
4,453,426 6/1984 Groutage et al. ........................ 74/2
4,842,218 6/1989 Groutage et al. .................... 244/3.28

FOREIGN PATENT DOCUMENTS 1947500 4/1971 Fed. Rep. of Germany ........ 244/46
2426061 12/1975 Fed. Rep. of Germany ........ 244/46

*Primary Examiner*—Charles T. Jordan
*Assistant Examiner*—Rochelle Lieberman
*Attorney, Agent, or Firm*—Charles T. Silberberg; Harold C. Weston; Max Geldin

[57] ABSTRACT

A high speed aircraft fitted with a unitary, rotatable wing coupled to the craft's fuselage at a hollow turret or solid pivot pin, enabling it to operate with the wing in either of two ninety degree opposed positions.

21 Claims, 3 Drawing Sheets

90 DEGREE ROTATION AIRCRAFT WING

BACKGROUND OF THE INVENTION

This invention relates to rotatable wing aircraft and more particularly to one in which the wing is unitary in nature and coupled to the fuselage through a large hollow turret, enabling it to be held in either of two positions, a 90 degree position, perpendicular to the fuselage for low speeds, and a 0 degree one, parallel to the fuselage, for high speed flight. Alternatively, the wing could be coupled to the fuselage through a solid pivot pin, but structures would require more weight for the condensed stress areas. At high speeds, the wing is faired into fuselage structure with its upper surface and an overlap portion with winglets cooperating with the lower surface of the fuselage to provide necessary lift. A set of winglets, small moveable aerosurfaces, is built into the center of the wing, each cooperating with the other to provide roll control and lift at high speeds when the wing is parallel with the fuselage. Greatly reduced "wetted" area of the wing is produced by this condition with up to 50 percent of the bottom of the wing nested into the fuselage and with a corresponding reduction in aerodynamic drag of approximately 25 percent.

For low speeds employed during takeoff and landing, the wing is oriented perpendicular to the fuselage, utilizing pivoted winglet type ailerons at either extreme for lift and control torques. Typical winglets comprise about 10 percent of total wing area. At high speeds, the wing is nested parallel to the fuselage, its upper surface contoured to provide lift as required in cooperation with the bottom of the fuselage and overlap beyond the nested area. Winglets extending from both sides of the middle of the wing provide roll control during high speed operation. Computerized winglet control during the transition mode maintains reasonable attitude conditions of the aircraft, while nesting the wing parallel to the fuselage reduces its wetted area by 25 to 30 percent, greatly increasing efficiency of high speed operation. At the low speed, or ninety (90) degree position, a high aspect ratio wing is provided that is more efficient than delta types and which provides more maneuver response than delta wings at such lower speeds.

The National Aeronautics and Space Administration (NASA) has conducted extensive experimentation on oblique wing aircraft wherein a unitary wing (i.e. a single member extending symmetrically about a central chord) is pivoted in flight to form an angle with the fuselage to reduce its wetted area, increase leading edge sweep, and, consequently, reducing its aerodynamic drag. Tests, to be conducted in the late 1989 time period, will provide for pivoting wings at up to 60 degrees for flight at speeds up to Mach 1.4 (about 1000 miles hr). The aircraft scheduled for such tests is known as the Digital Fly-By-Wire (DFBW) test bed, NASA model F-8.

The DFBW has been in use for several years as a flying test platform for electronic, computer operated, flight control systems. Integration of computer controls with wing positioning mechanisms of the within invention will allow for safe transition from one orientation to the other at all speeds, up to, and including, supersonic and at right angles to the conventional wing orientation, as opposed to DFBW's 60 degree inclination.

Rotation of the wing from its 0 degree, high speed orientation to the 90 degree condition will provide the craft augmented "post-stall" or "super-maneuvering" capability by reason of the 90 degree condition's greater lift, higher drag and lower stall speed. Such capability provides escape potential and attack maneuver capability considerably exceeding that of conventional delta or double delta winged vehicles.

Many advantages accrue from use of the unitary, rotatable wing presented herein. High lift provided with the wing rotated 90 degrees from the fuselage allows slower speeds for takeoff and landing with associated shorter runways. The slower speeds and increased lift requires lighter weight landing gear and shock structure. Angles of approach to runways can be steeper for the reduced speeds involved and pilots are afforded greater visibility over the nose of the aircraft.

Use of such an airplane for fleet support on aircraft carriers is particularly beneficial. After landing with the wing at its high lift position, the craft is hangared and moved with that wing stowed parallel to the fuselage at significant economies in volume required, a prime concern of naval vessels.

Primary advantage of the 90 degree rotation wing is the greatly reduced frictional drag when the plane is performing at high speeds. 25 to 30 percent of the normally "wetted" area of the wing is hidden over the fuselage when it, the wing, is in the 0 degree orientation.

Because of the wing's unitary nature, enhanced use of internal volumes for fuel storage or other purposes is provided. Conventional or swing wing craft exhibit discontinuities at their interfaces with craft structure with complicated strengthening provisions often made which intrude into the wing and fuselage structure. In the 90 degree rotatable wing, flexible fuel and hydraulic lines provide optimal reliability with no "moving parts" for junctions or moveable joints and a large turret connector between wing and fuselage provides a simple, highly reliable support for rapid, low energy transfer between the 0 degree high speed, low friction, and 90 degree, low speed, high lift positions.

Since the connecting turret between wing and fuselage of this craft will have extensive bearing surfaces and possibly air bearings for reduced friction in transit, greatly enhanced maneuverability in air to air combat situations can be achieved by transfer of the wing from its 0 degree, high speed, position, to the 90 degree, low speed, high lift condition. Preliminary studies indicate that such a change in wing positioning can be effected at supersonic speeds with resultant high decelerations and vertical lift vectoring. Such maneuvers may be critical in evading high speed missiles with less maneuverability. Winglet operation during high speed change of orientation is not required but rapid changes in craft performance parameters are readily accommodated by electronic means coupled to other control surfaces such as rudders and elevators.

Reorientation of the wing of the within disclosed aircraft will allow a plurality of such craft to be transported by air in a single existing cargo air lifter. Rapid operational availability from a remote airstrip is achieved from this mode of transfer, with no reassembly or rework required for operability.

Actuation of the 90 degree wing to its 0 degree position (or vice versa) may be effected by such simple and reliable means as cranks activated by hydraulic or pneumatic pistons. Cranks and drives will be reciprocal and a common system, or redundant dual systems, used for driving the wing into either orientation. Nesting provisions in the fuselage provide for smooth stream lines over the wing's upper surface in either the 0 or 90 degree positions.

Detail features of repositioning means, fuel management, hydraulic line provisions and other aspects of the unitary, rotatable wing are not primary to this invention. They are mentioned and described herein to illustrate that they are all suporting elements to the primary rotatable wing aircraft, subject and object, of this disclosure.

The present invention provides a high performance aircraft, amenable to both low speed and supersonic flight with a supporting unitary wing having winglet control surfaces, which wing can be commanded to either of two ninety degree opposed positions to meet lift or speed requirements determined by its pilot. A number of features and attributes of such a craft is provided herein, but the primary invention is a rotatable wing aircraft as claimed below.

Moveable wing aircraft are known in the art of aeronautics. NASA's AD-1 and F-8/DFBW, are two examples. Swing wing craft such as that of U.S. Pat. No. 2,673,047, Foldable-Winged Craft by R. A. Scarato, the Pivotal Wing Cruise Missile of U.S. Pat. No. 4,453,426 by Groutage, et al are also examples of this type of vehicle. None of those studied possesses the features or advantages of the within invention.

SUMMARY OF THE INVENTION

This invention relates to a special class of winged airplane. In general, airplanes depend on extended air foils where different air velocites over air foil surfaces result in positive differential pressure on the undersides thereof, providing lift to support the other parts of the craft not so specially configured. In general, the higher the forward velocity of such craft, the greater the drag, or negative force, on the lifting surfaces because of turbulence and air friction between the medium and craft structure.

Designs to minimize friction include such as that of the "flying wing", where all of the craft is part of the lifting surface and no fuselage is present to require extra support. Swing wing craft are in military arsenals to provide greater wing area at slow speeds and reduction of wetted area at high speeds by folding part of them into the fuselage proper.

The aircraft described herein is particularly applicable to military missions where the essential elements of high speed, high maneuverability, compact storage and ease of transport are paramount.

The wing of such an aircraft is unitary in nature, i.e. it is an integral unit that moves withoutjoints of flexure as is the case with swing wing craft or foldable wing carrier planes. This unitary configuration, without major interference from fuselage attachment structure, allows the entire wing to be used for storage of operational equipment or, as a primary advantage, fuel. Fuel consumption routines provide for use of fuel from compartments at the wings outer extremities for takeoff and early flight regimes. As the mission matures and high speeds are achieved, the wing may be commanded to its 0 degree orientation along the principal roll axis of the plane. This position transfer operation can be effected in a short period, within a few seconds, where proper actuation facilities are included in structural design. During the position transfer mode, transient force unbalances occur over the moving surfaces but they are of short duration, during the transfer, and do not result in control problems for the resulting configuration.

Modern supersonic aircraft often employ moveable rear stabilizer surfaces to control aircraft attitude while operating in the supersonic mode. Shock wave effects and other phenomena involved in supersonics require this. The aircraft of this invention may well employ computer controlled rear stabilizer elements to assist in stability maintenance during transfer of the wing from its high speed to low speed (and vice versa) condition. Rudders, elevons and stabilizer surfaces proper can be engineered to work in concert or independently in response to attitude stimuli during transition.

Throughout the motion sequence aft clearance of the wing with fuselage structure is assured. Winglet control and interlocks associated therewith can be mechanized in a variety of ways and such means are contemplated hereby as defined in the attached claims.

The preferred embodiment of the rotating wing of this invention utilizes a turret which mates the wing with the top surface of the fuselage. This is the preferred embodiment because of its structural efficiency, simplicity and economies of uninterrupted fuel storage or fluid compartment feed lines. Another embodiment provides for mounting the wing on the underside of the fuselage. Retractable landing gear can be accommodated with the design so long as care is exercised to insure that symmetry of weight distribution about the craft's centerline is maintained when the wing is in the 0 degree position. Aircraft carrierlanding hooks, or other arresting gear for short landing fields, are readily designed into the invention.

OBJECTS OF THE INVENTION

Accordingly, it is the primary object of this invention to provide an airplane with a rotatable wing, fixed at either a 0 or 90 degree orientation with respect to its fuselage, providing reduced air friction at high speeds in the 0 degree position while preserving high lift and high aspect ratio for takeoff and landing operations.

Another object of the invention is to provide a winged airplane for which the wetted area of its lifting surface is reduced by 25 percent or more by reorientation thereof from a low speed, 90 degree position, to a 0 degree, high speed one with one surface of the wing (either top or bottom, dependent on design) nested into the fuselage on command of the pilot.

Still another object of the invention is to provide an aircraft capable of high performance at either subsonic or supersonic speeds, which is readily transported, without disassembly, and which is operable from short runways or aircraft carriers.

An additional object of the invention is to provide a unitary wing aircraft, operable with its wing in either of two 90 degree opposed positions, capable of transferring positions of such wing from its 0 degree to 90 degree positions while traveling at high speeds to quickly change its maneuverability traits in combat scenarios.

A further object of the invention is to provide a rotatable wing aircraft wherein the wing is supported by turret means on low-friction bearings during transit over its 90 degrees of repositioning.

Yet another object of the invention is to provide a unitary rotatable wing aircraft with fuel storage means and winglets integral with such wing, and with programmed control of fuel consumption and winglets to provide maximal stability and control of such craft during reorientation of such wing.

A further object of the invention is to provide a high performance military combat aircraft with supersonic capability and means to perform step function course changes by means of rotating its unitary wing from a 0 degree orientation to a high lift, high drag condition in a short time interval.

A still further object of this invention is to provide a rotatable wing array with a symetrical pressure field to sidebody or bottom engine inlets at high speeds.

These, and other objects of the invention will become more apparent from the following description of its preferred embodiment as illustrated by the accompanying drawings.

DETAILED DESCRIPTION OF PREFERRED EMBODIMENT

Figure 1:
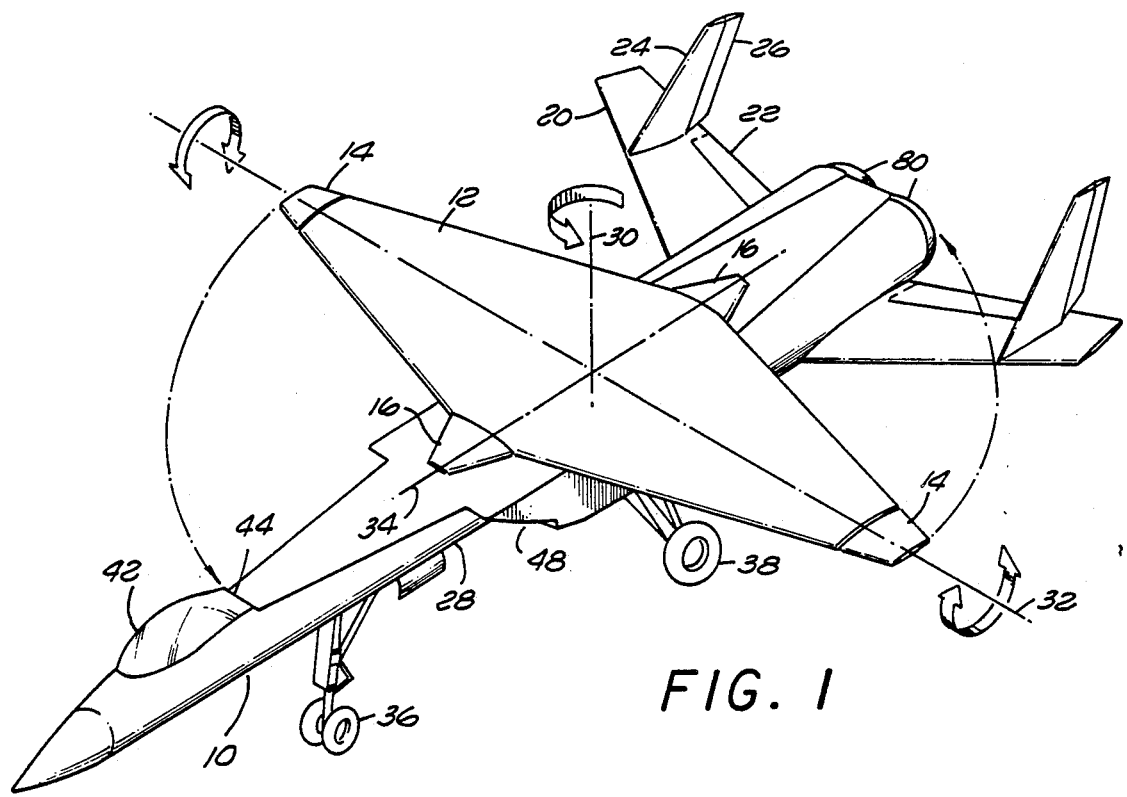
FIG. 1 is a perspective view of a rotatable wing aircraft with its top mounted wing at the 90° position.

The high performance, rotatable wing aircraft 10 of this invention is comprised of an elongated fuselage 28 with cockpit 42, nose gear 36, main gear 38, horizontal stabilizers 20, vertical stabilizers 24, jet engines 80 and rotatable wing 12. Wing 12 is coupled to fuselage 28 through a cylindrical turret assembly 18 as shown in FIGS. 3 through 6 and is rotatable about yaw axis 30. It provides lift for the aircraft in either of two 90 degree opposed positions.

FIG. 1 shows wing 12 in its 90 degree position (i.e. its major chord at 90 degrees to fuselage 28). This 90 degree position shows maximum wetted area of wing 12 and is the position normally employed by the pilot for takeoff and landing of the vehicle. While the 90 degree position provides maximum lift to vehicle 10, it also produces more aerodynamic drag and tends to limit performance at supersonic speeds.

Figure 2:
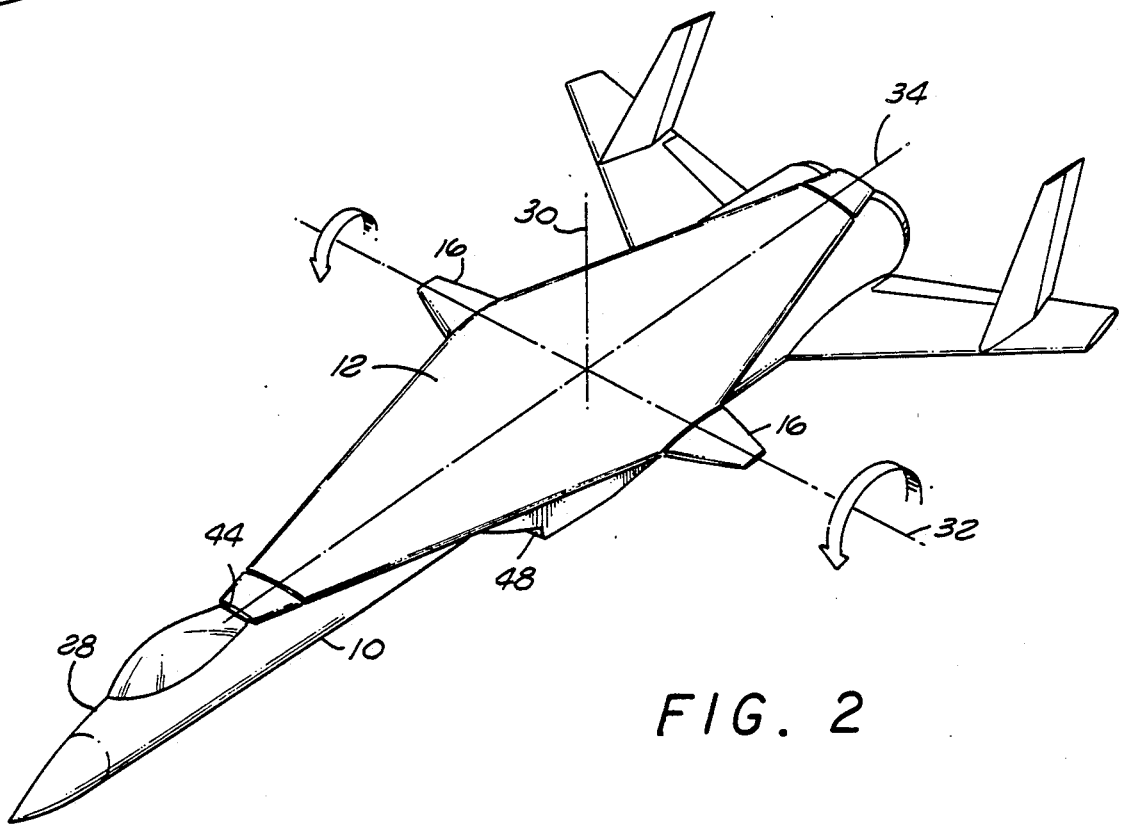
FIG. 2 is the same perspective view as FIG. 1 with the wing rotated to the 0 degree position.

FIG. 2 shows wing 12 aligned with the major (i.e. "roll axis") 34 of fuselage 28, in which position over 50 percent of its lower surface 58 is nested atop fuselage 28 behind nesting provision 44 in the rear of cockpit 42. Removal of this large wing area from the air stream past vehicle 10 significantly reduces aerodynamic friction and enhances performance parameters such as speed, fuel consumption and aerodynamic heating.

Figure 4:
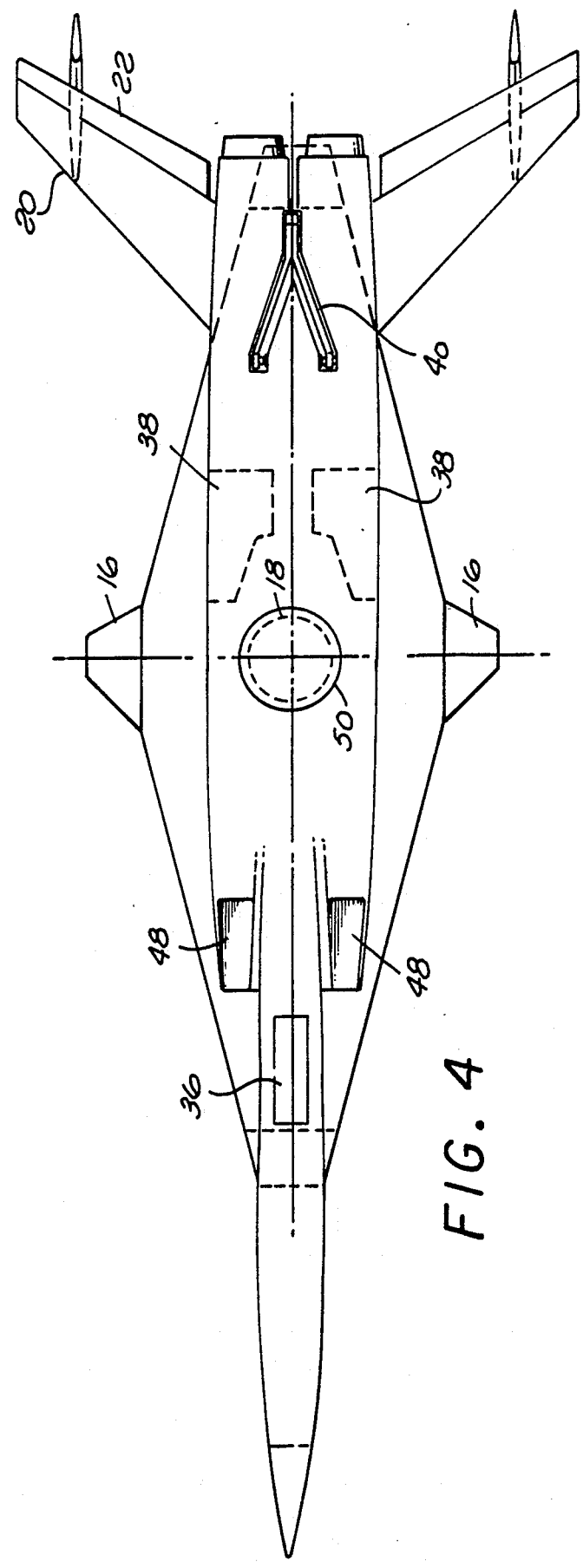
FIG. 4 is a bottom view of the aircraft of FIG. 2

When operating in the 0 degree position, wing 12 has lifting surfaces extending beyond fuselage 28 as shown in FIG. 4. A reduction in width (the minor chord of wing 12) results in reduction of the available lifting surface and proper design considerations will provide the tradeoff necessary for reduction in wetted surface, that is the underside 58 of wing 12 nested atop fuselage 28, versus lift required for operational requirements.

Wing 12 is designable to arbitrary performance requirements with due consideration given to speeds, maneuverability and load carrying capacity. It will be generally symmetrical in plan form with right and left halves thereof being mirror images of each other in both the 0 and 90 degree modes of operation. The cross section of preferred wing 12 will be of the circular-arc or symmetric biconvex type, along both major wing axes. Wing lower surface 58 has a contour radius much greater than that of upper surface 60, being nearly flat along both major wing axes. Performance parameters determine shape and structure of wing 12 but mirror image identity of wing halves in both orientations is essential.

Wing 12 is unitary in nature being built as a separable unit and operating as a fixed element during flight. Unitary construction provides for integrated arrays of support structure such as spars 56 and coupling between wing structure to turret assembly 18 as required by performance stresses to be met in operation.

Wing 12 is also fitted with roll control means such as winglets 14 and 16. Control of these winglets is maintained through means such as electric motors, hydraulic actuators, pneumatics or other linkages.

Since performance of wing 12 is possible in both sub and supersonic regimes, transference between the high lift, 90 degree and high speed, low drag, 0 degree position involves transients in flight characteristics. Change from one position to the other can be effected in a very few seconds and where instabilities in performance are encountered, computer means can be employed to operate elevons 22 and rudders 26 in special fashion to provide necessary corrections. Conventional supersonic craft also employ moveable stabilizer surfaces such as 20 and 24 to operate cooperatively or independently, in response to airframe data, to achieve stability during wing shift operations. High symmetry of wing 12 and its resultant equilibrium of stress fronts during transit make stability control a relatively routine part of craft operation.

Where winglets such as 14, 16 are used for roll control, they will normally operate about a central axis 32, parallel to the pitch axis of invention 10.

Figure 3:
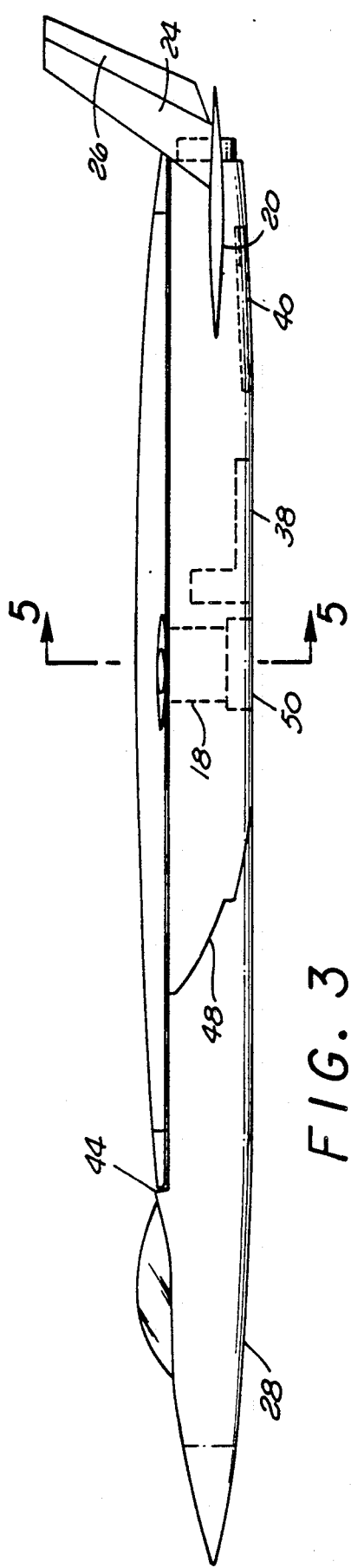
FIG. 3 is a side elevation of the aircraft of FIG. 2.
Figure 5:
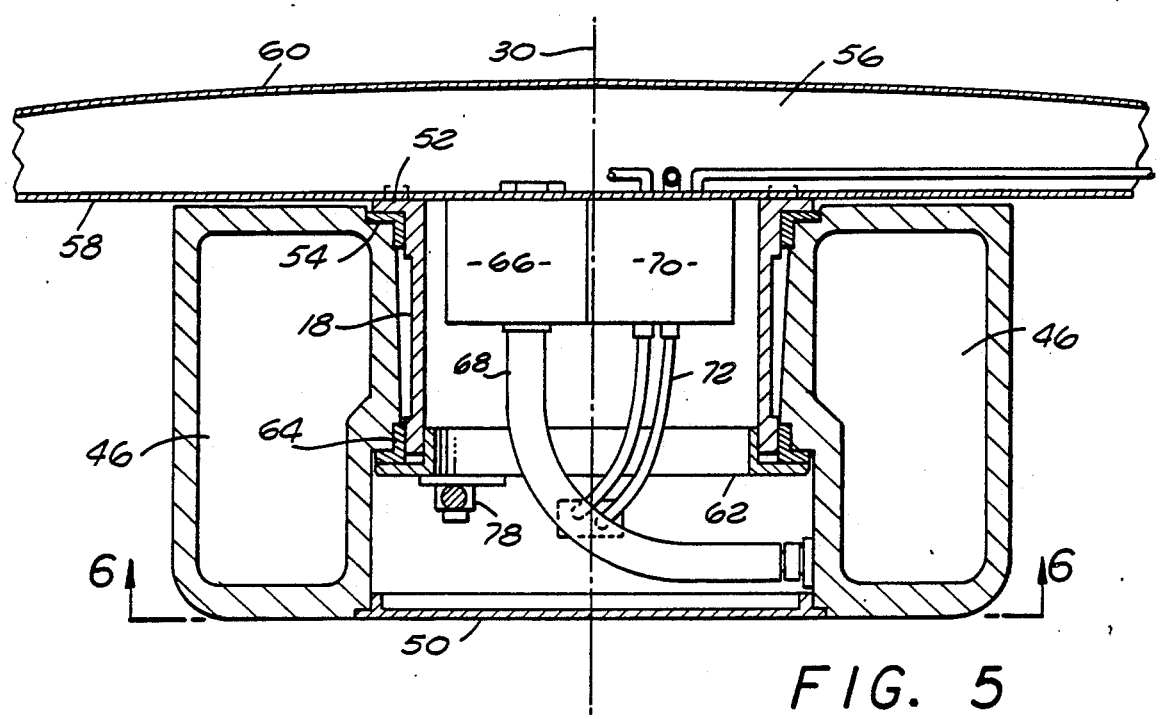
FIG. 5 is a sectional view of a turret assembly coupling the rotatable wing to the aircraft's structure.
Figure 6:
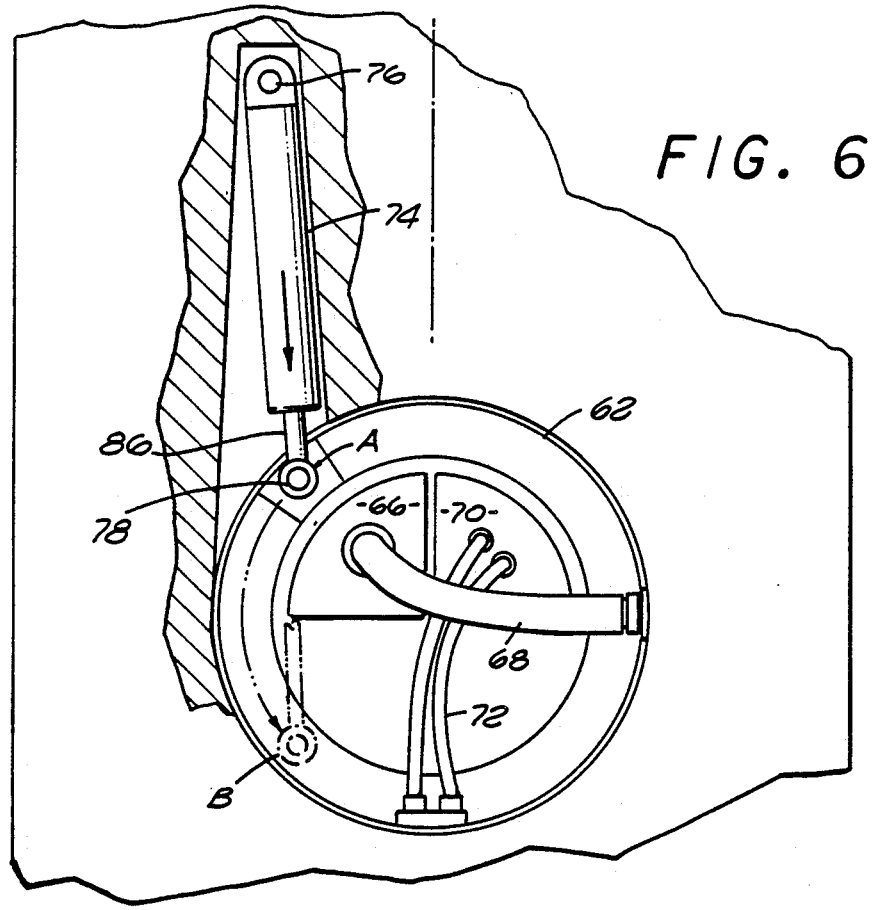
FIG. 6 is a sectional view of a positioning system for rotating the wing of this invention.

FIGS. 3 and 4 illustrate the general coupling of wing 12 to fuselage 28 at its midpoint, through turret means 18. Turret means 18 may be any type of securement provision with bearing surfaces and position change actuating force means. Illustrated in FIGS. 5 and 6 is a preferred embodiment of such a means, comprising, generally, a cylindrical shell of lightweight, high strength material, coupled to as many of wing spars 56 as possible for economies of its placement in fuselage 28. Shown in FIG. 5 turret assembly 18 is fixed solidly to wing spars 56 all around its upper flange 52. Upper flange 52 rides on low friction upper bearing 54. Bearing 54 may be a solid material such as low friction plastic, roller bearings, ball bearings or even air bearing means to minimize friction and allow for rapid change in wing 12 orientation. Lower bearing means 64 may be of design similar to that of bearing means 54 or any combination of bearing means. Coupling between fuselage 28 and turret assembly 18 occurs at flange 62 which rides on bearing means 64. Bearing means 64 is built into fuselage 28 through structure of engine feed ducts 46. One of the features of invention 10 and its rotating wing 12 is the uninterrupted flow of air from air inlets 48 through ducts 46 to engines 80.

Turret lower flange 62 is provided with a drive lug assembly 78 which is coupled to double acting actuator 74 through drive rod 86. Actuator 74 may be of a variety of types. Simplest to illustrate as typical is a hydraulic unit fed by valves (not shown) and powered from systems fixed in fuselage 28. Actuator 74 is anchored to fuselage 28 at pivot 76, based on fuselage structure.

Wing 12 may have an integrated array of fuel tanks throughout its extent. Not requiring wing structure interrupts for coupling to fuselage 28, more volume for tankage is available in aircraft 10 than in conventional, swing wing aircraft of similar performance specifications. Fuel in wing 12 may be routed to engines 80 from fuel manifold 66, fixed to wing 12, through flexible feed line 68. When turret assembly 18 is rotated from the A position of FIG. 6 to the B position, flex lines 68 and 72 remain coupled between their wing junctions and fuselage systems such as electrical power and hydraulics. Actuator 74 drives turret assembly 18 through its output shaft 86 and turret drive lug assembly 78. Control of winglets 14, 16 and other functions, electrical, hydraulic and pneumatic is continuous throughout position transfer of wing 12 although an interlock system is essential to insure alignment with wing 12 major surfaces prior to nesting on fuselage 28 (for either the 0 or 90 degree condition).

Hydraulic/electrical/pneumatic junction box 70 is, like manifold 66 (FIG. 5), fixed to wing 12. Electrical cables and/or fluid lines 72 are flexible in nature, precluding use of failure-prone mechanical rotary couplers.

Adjustment means (not shown) may be incorporated into the flange/bearings provisions of turret assembly 18. Access to such adjustment means and to the entire inner componentry of the turret is provided by access cover 50 at the base of turret assembly 18. Turret flange 62 is adjustable vertically (along axis 30) for preloading as required.

While proper design considerations can be made allowing this invention to be constructed with wing 12 mounted on the bottom of fuselage 28, concerns with balance and landing gear as well as armaments disposition renders the above described embodiment as preferred.

Aircraft 10 is particularly amenable to operation from short runways or aircraft carriers because of its high lift and low stall speeds in the 90 degree orientation of wing 12. Landing arresting gear such as hook 40 (FIG. 4) can be used effectively. The greater lift of 90 degree wing 12 also allows lower landing speeds, flatter angles of approach and reduced demands on extension and strength requirements on landing gear. In fighter situations, rotation of wing 12 from the 0 to 90 degree position will produce instantaneous change in craft performance which can be designed into turret coupling means. Increased lift resulting will permit evasive maneuvers not possible with conventional supersonic aircraft.

Variations in the above preferred embodiment will be obvious to those interested in altering that embodiment for special purposes. Such variations are comprehended, to the extent described, by the following claims.

I claim:

1. An aircraft designed to operate effectively at both moderate and supersonic velocities comprising:
   a fuselage having attitude stabilizer pitch and yaw control means;
   a unitary wing having roll control means;
   turret means coupling said wing to said fuselage through bearing means,
   said turret means comprising a shell coupled to said wing, said shell being rotatable on said bearing means, and
   actuator means connected to said shell and capable of driving said wing to positions parallel or perpendicular to said fuselage for normal operations.

2. The aircraft of claim 1, said fuselage having an upper side, and wherein said unitary wing is coupled to the upper side of said fuselage by said turret means.

3. The aircraft of claim 2 including hook means for landing arrest.

4. The aircraft of claim 2 wherein said unitary wing is configured with a plurality of fuel tanks coupled to said fuselage through flexible feed lines.

5. The aircraft of claim 2 wherein said unitary wing is provided with hydraulic fluid lines for powering winglets, said fluid lines coupled to said fuselage through flexible tubing.

6. The aircraft of claim 2 wherein said unitary wing is provided with electric drive motors for powering winglets by means of flexible electric conductors coupled to said fuselage.

7. The aircraft of claim 5 wherein said wing has outermost cells, and fuel consumption is controlled by computer means to utilize fuel from said wing's outermost cells first.

8. The aircraft of claim 3 wherein said winglets are controlled by computer means during movements of said unitary wing between positions of normal operation.

9. The aircraft of claims 1 or 2 wherein said bearing means comprise at least one surface of low friction plastic material.

10. The aircraft of claim 1 wherein said bearing means comprise air bearings.

11. The aircraft of claim 1 including electronic sensor means which controls position of said wing and operation of said craft.

12. The aircraft of claim 1 wherein said actuator means comprises pivoted hydraulic piston and crank means, the combination of said hydraulic piston and crank means capable of providing position change of said unitary wing at all speeds of normal operations.

13. The aircraft of claim 1 wherein said actuator means comprises pneumatic cylinder and piston means actuated by electrical signals.

14. The aircraft of claim 13 wherein said electrical signals are derived from combat sensor means.

15. The aircraft of claim 1 including thrust vector control means.

16. The aircraft of claim 1 wherein said pitch and yaw control means are capable of being operated by signals from electronic control systems including computer means.

17. The aircraft of claim 1 wherein said pitch and yaw control means are combined to provide attitude control through differential operation of rudder and elevon means.

18. The aircraft of claim 1, said bearing mean including an upper bearing and a lower bearing, both of said bearings connected to said fuselage, and also including an upper flange and a lower flange, both of said flanges connected to said shell, said upper and lower flanges riding on said upper and lower bearings, respectively.

19. An aircraft designed to operate effectively at both moderate and supersonic velocities comprising:
   a fuselage having attitude stabilizer means in pitch and yaw;
   a unitary wing having roll control means including tips and winglets at said tips active for roll control while said wing is perpendicular to said fuselage;

turret means coupling said wing to said fuselage through bearing means, and actuator means capable of driving said wing to positions parallel or perpendicular to said fuselage for normal operations.

20. An aircraft designed to operate effectively at both moderate and supersonic velocities comprising:

a fuselage having attitude stabilizer means in pitch and yaw;

a unitary wing having a center and roll control means including winglets extending from said center for roll control when said wing is parallel to said fuselage;

turret means coupling said wing to said fuselage through bearing means, and actuator means capable of driving said wing to positions parallel or perpendicular to said fuselage for normal operations.

21. The aircraft of claim 20 wherein winglets are controlled by computer means during movement of said unitary wing between positions of normal operation.

* * * * *